United States Patent
Mohan et al.

(10) Patent No.: US 9,294,708 B2
(45) Date of Patent: Mar. 22, 2016

(54) SYSTEM AND METHOD FOR INTERACTING WITH DIGITAL VIDEO RECORDERS THROUGH NETWORKING APPLICATIONS

(71) Applicant: Honeywell International Inc., Morristown, NJ (US)

(72) Inventors: Sathishkumar Mohan, Tamilnadu (IN); Trishla Seetharaman, Tamil Nadu (IN); Raja Manikandan, Tamil Nadu (IN); Abdul Raheem, Tamil Nadu (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 82 days.

(21) Appl. No.: 13/778,541

(22) Filed: Feb. 27, 2013

(65) Prior Publication Data

US 2014/0241695 A1    Aug. 28, 2014

(51) Int. Cl.
| | |
|---|---|
| H04N 5/765 | (2006.01) |
| G08B 13/196 | (2006.01) |
| G08B 25/14 | (2006.01) |
| H04L 12/58 | (2006.01) |
| G08B 25/08 | (2006.01) |

(52) U.S. Cl.
CPC ............ *H04N 5/765* (2013.01); *G08B 13/1968* (2013.01); *G08B 13/19656* (2013.01); *G08B 13/19682* (2013.01); *G08B 25/14* (2013.01); *H04L 51/18* (2013.01); *G08B 25/08* (2013.01)

(58) Field of Classification Search
CPC .......... H04N 21/4755; H04N 21/4786; H04N 21/6543; H04N 5/765; G06F 2221/2117
See application file for complete search history.

(56) References Cited

U.S. PATENT DOCUMENTS

| | | | |
|---|---|---|---|
| 7,908,635 B2 * | 3/2011 | Barton et al. | 725/134 |
| 2005/0149987 A1 * | 7/2005 | Boccon-Gibod et al. | 725/135 |
| 2008/0184326 A1 | 7/2008 | Nakajima | |
| 2009/0233542 A1 | 9/2009 | Gratton et al. | |
| 2011/0126258 A1 * | 5/2011 | Emerson et al. | 725/133 |
| 2011/0161839 A1 | 6/2011 | Farris et al. | |
| 2012/0314127 A1 * | 12/2012 | Syed et al. | 348/384.1 |
| 2013/0097257 A1 * | 4/2013 | Jorakuji et al. | 709/206 |

* cited by examiner

*Primary Examiner* — Huy T Nguyen
(74) *Attorney, Agent, or Firm* — Husch Blackwell LLP

(57) ABSTRACT

A method and apparatus are provided. The method includes the steps of providing a web or social networking account within a chat server for a digital video recorder (DVR) of a security system, the DVR receiving a chat message from a person through the chat server and the DVR automatically executing a predetermined instruction corresponding to a content of the received chat message.

20 Claims, 2 Drawing Sheets

SYSTEM AND METHOD FOR INTERACTING WITH DIGITAL VIDEO RECORDERS THROUGH NETWORKING APPLICATIONS

FIELD

The field of the invention relates to security systems and more particularly to methods of accessing the information within a security system.

BACKGROUND

Security systems are generally known. Such systems are typically used to protect people and/or assets within a secured area. The secured area is often surrounded by a physical barrier (e.g., walls, fence, etc.) with one or more portals (e.g., windows, doors, etc.) to allow the entrance and/or egress of authorized persons and materials.

Within the secured area may be a number of sensors coupled to an alarm panel. The sensors may be coupled to each of the doors and/or windows in order to detect intruders as they pass through or may operate in a more general sense to detect motion within portions of the secured area.

The alarm panel may detect an intruder via activation of one of the sensors and sound a local alarm. Alternatively, the alarm panel may send an alarm message to a central monitoring station.

In some cases, the sensors may include one or more video cameras. The video cameras may be motion activated or record video from the secured area into one or more video files.

While such systems work well, it is not always possible for an owner to be available to respond to alarms. Accordingly, a need exists for better methods of accessing from remote locations the information generated by operation of the security system.

DETAILED DESCRIPTION OF AN ILLUSTRATED EMBODIMENT

Figure 1:
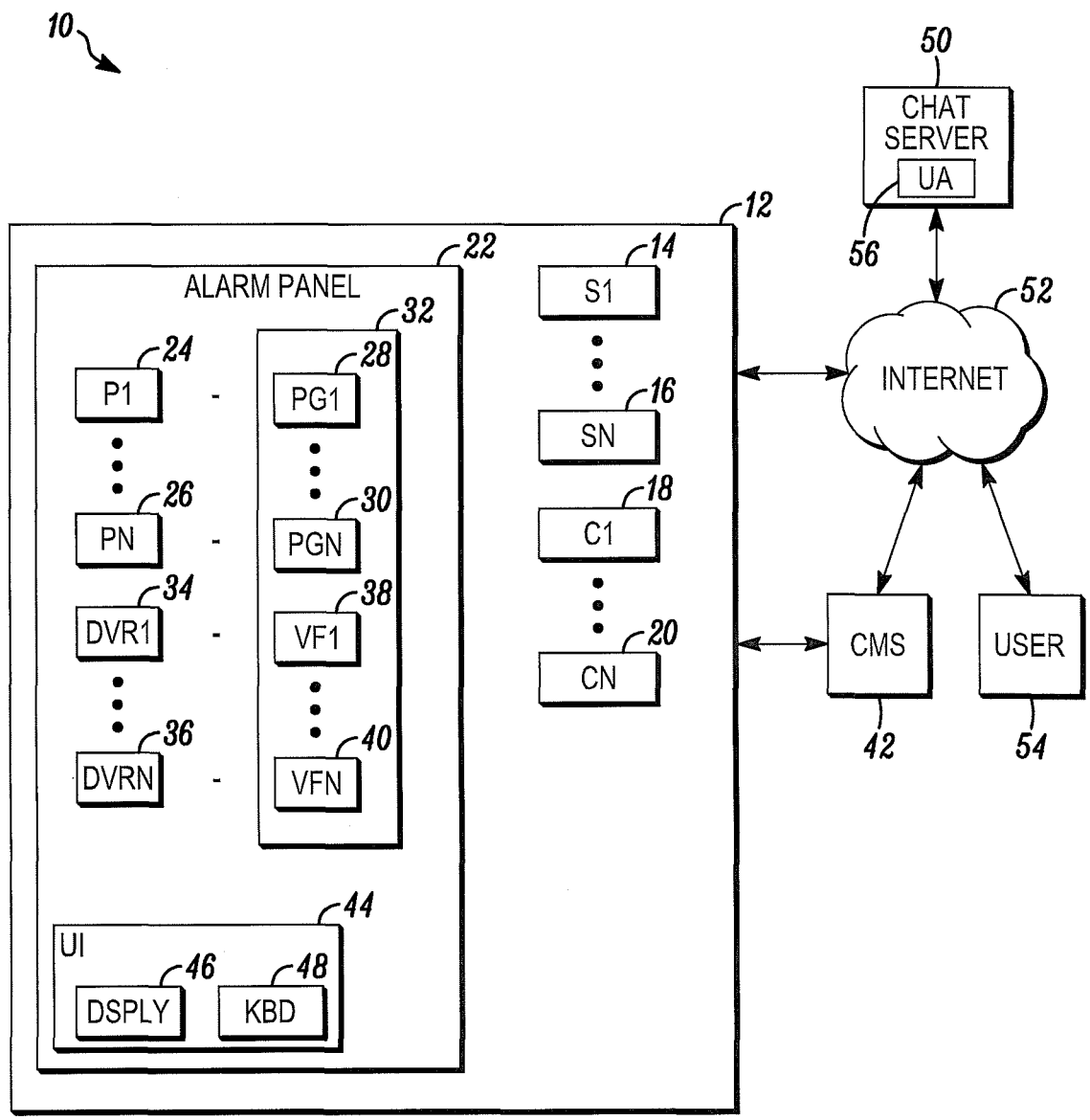
FIG. 1 depicts an alarm system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. The system 10 may be used to protect people and/or assets within a secured area 12 via operation of one or more sensors 14, 16 and/or cameras 18, 20.

An alarm panel 22 within the secured area 12 may be provided within the secured area 12 to monitor the sensors 14, 16 and cameras 18, 20. Included within the alarm panel 22 (or within the respective components of the alarm panel) may be a number of processor apparatus (processors) 24, 26 operating under control of one or more computer programs 28, 30 loaded from a non-transitory computer readable medium (memory) 32. As used herein, reference to a step of a computer program 28, 30 is also a reference to the processor 24, 26 that executed that step.

One or more digital video recorders (DVRs) 34, 36 may also be provided within the alarm panel 22. The DVRs 34, 36 may operate to record video received from cameras 18, 20 within one or more video files 38, 40.

In operation, a monitoring processor 24, 26 may monitor the state of the sensors 14, 16 and cameras 18, 20 for indication of the presence of an intruder. In this case, the sensors 14, 16 may include one or more limit switches attached to the doors or windows blocking access to the secured area 12. Similarly, the cameras 18, 20 may include one or more motion detection processors that detect motion in a field of view of the respective camera 18, 20 and send an alert to the alarm panel 22. Upon detection of an intruder, an alarm processor 24, 26 within the alarm panel 22 may send an alarm message to a central monitoring station 42. The central monitoring station 42 may respond by alerting a local police department.

The DVRs 34, 36 may record video from each of the cameras 18, 20 continuously or only upon detection of motion within a respective field of view of the camera 18, 20. In this regard, each of the DVRs 34, 36 may include its own motion detection processor 24, 26 or may rely upon operation of a motion detection processor operating from within each of the respective cameras 18, 20. Upon detecting motion from one of the cameras 18, 20, the corresponding DVR may save a sequence of video frames from the camera along with an identifier of the camera 18, 20 through which motion was detected.

Associated with the alarm panel 22 may be a user interface 44. The user interface may include a display 46. The display 46 may be a touch screen display or the user interface 44 may include a separate keyboard 48 through which a user may enter commands. Commands in this case may be directed to a processor 24, 26 that arms or disarms or otherwise controls the security system 10. Alternatively, the commands may be directed to a video processor 24, 26 of the DVRs 34, 36 that displays video from the cameras 18, 20 on the display 46.

Figure 2:
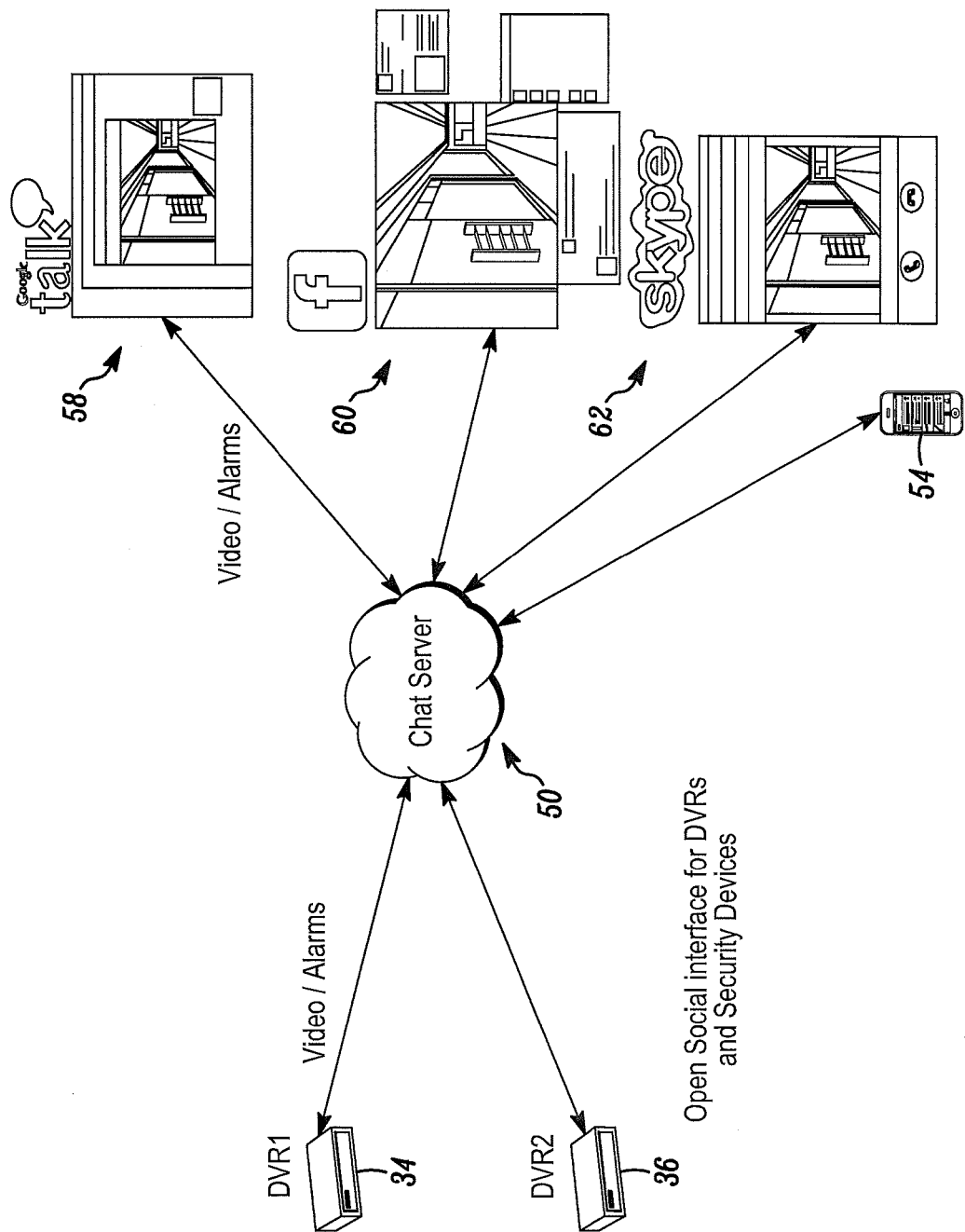
FIG. 2 is a simplified diagram of the DVRs and networking system of FIG. 1.

Under the illustrated embodiment, the DVRs 34, 36 or alarm panel 22 may include a chat networking processor 24, 26 that interacts with a chat server 50 to process messages from a user 54. In this regard, a user working through the user interface 44 or user device 54 may open a web or social networking account 56 (e.g., a Gmail account 58, a Facebook account 60, a Skype account 62, etc.) on a web or social networking (chat) server 50 (as indicated separately in FIG. 2) using an appropriate network address (e.g., DVR1chat@gmail.com) of the DVR 34, 36.

Once the DVR has its own social networking account, an authorized user 54 may add the DVR 34, 36 as a contact under the corresponding social networking account. For example, the user may send a friend request to the DVR 34, 36 at the address of the DVR (e.g., DVR1chat@gmail.com). The user may then sign into the account of the DVR on behalf of the DVR and accept the friend request.

Once the friend request is accepted by the DVR, the user is able to view the status of the DVR, and chat with the DVR 34, 36 much like chatting with any other friend. The user can chat with the DVR through any of a number of applications that are commonly available and commonly loaded onto the mobile device 54. For example, in the case of Gmail, the person can chat with the DVR through a chat client (e.g., a chat window, web page, etc.) presented on a display of the user device 54.

Once the DVR 34, 36 is powered up and is active, its contact becomes available online through the chat server 50. The user 54 can view video of a camera 18, 20 connected to the DVR by initiating a video chat session to the social networking address (contact) of the DVR. In this regard, a DVR sub-system (e.g., instruction processor 24, 26) may attach a video sequence to a chat response to the user 54. The subsystem shows the requested video as its own video in the client window of the video chat session. Similarly, the user can retrieve other information like alarms, by sending predefined instructions (chat messages) to the DVR contact. This enables the user to retrieve video and information from the DVR, without the need for any specialized video surveillance software.

In this regard, the software programs 28, 30 allow the software sub-systems to connect and interact with the Gmail/Skype/Facebook or other networking web sites. As noted above, the process begins by creating a Gmail, Skype or Facebook account for the DVR. The DVR system will accept requests (e.g., friend requests) only from authorized preconfigured users and requests from other users will be rejected and hence other unauthorized users cannot view video from the DVRs 34, 36.

When the DVR receives a chat message from the user, a message processor of the DVR compares the content of the message with a message table to identify a match and retrieve a corresponding instruction to be executed by the instruction processor of the DVR. By finding a match, the DVR understands the message, and responds back with the requested information through the appropriate sub-system. For instance, if the DVR contact receives the chat message "Camera 1 video", then the DVR will establish a video call providing the real-time video of the requested camera which the user can view in the chat client (window).

Under another example, if the DVR contact should receive the chat message "alarms", then the DVR may send a list of active alarms to the user. In this case, the message processor may compare the word alarms with the contents of the message table, find a match and retrieve the corresponding instruction. The instruction processor may send a query to an alarm processor of the alarm panel 22 requesting a list of active alarms. A formatting processor may reformat the list into the appropriate format for transmission and display in the chat client of the user 54.

The software sub-system 28, 30 also allows the user 54 to change the configuration of the DVR via one or more chat messages. For example, by sending the chat message "Boost Camera 1" to the DVR contact, the user is able to trigger boosted recording (e.g., frames per second, the number of frames recorded after detection of movement, etc.) by one of the cameras controlled by the DVR.

The software sub-system 28, 30 also provides an alternative method through which the owner of the premises 12 may use to contact the remote operators (persons) of the central monitoring station 42. In this case, the message may have a format that includes an indicator of the destination, a colon and a text message (e.g., "Central Monitoring Station: Is my system in alarm?"). The instruction processor of the DVR forwards these messages to the video monitoring software used by the central monitoring station 42 and causes the central station software to present the text to the remote central station operators of the secured area 12. The central station operators may respond to the owner in a similar manner.

The software sub-system 28, 30 may also be extended to other security devices where real time information needs to be viewed. For example, the chat system could be used to view the status of fire detectors within the secured area in a similar manner.

In general, the system 10 provides a number of advantages over prior methods. For example, users are able to view the video from a selected DVR, send and retrieve information without the need for any specialized surveillance software. This can be accomplished using existing social networking sites, Instant Messaging applications, etc.

In addition, the user experiences no difference between chatting with a friend and chatting with the DVR in sending and receiving information. If the user does not use the correct syntax in any particular situation, the instruction processor may respond with a list of options via the appropriate chat response.

The DVR responds in a manner that appears to be instantaneous. This allows users to retrieve real-time information available to the DVR.

Only authorized users are able to view and retrieve information from the DVRs. In this regard, different authorized users may send friend requests and receive responses in substantially the same way as discussed above. Similarly, the DVRs 34, 36 may be assigned different contact addresses (e.g., DVR1chat@gmail.com, DVR2chat@gmail.com, etc.).

The software sub-system 28, 30 provides a user-friendly and interactive way of connecting with the DVR for review of video and other information. The user perceives little difference in the displayed information between that displayed by the system 10 directly and that displayed by the device 54.

In general, the system 10 provides a method and apparatus for displaying information. The method includes the steps of providing a web or social networking account within a chat server for a digital video recorder (DVR) of a security system, the DVR receiving a chat message from a person through the chat server and the DVR automatically executing a predetermined instruction corresponding to a content of the received chat message.

The system 10 may include a web or social networking account established within a chat server for a digital video recorder (DVR) of a security system, a chat message received by the DVR from a person through the chat server and a predetermined instruction corresponding to a content of the received chat message automatically executed by the DVR. Alternatively, the system 10 may include a digital video recorder (DVR) of a security system, a networking processor of the DVR that interfaces with a chat server through a web or social networking account established within the chat server for the DVR, a message processor of the DVR that processes a chat message received by the DVR from a person through the chat server and an instruction processor of the DVR that automatically executes a predetermined instruction corresponding to a content of the received chat message.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
    providing a web or social networking account within a chat server for a digital video recorder (DVR) of a security system;
    a user interface or user device of a person adding the web or social networking account of the DVR as a contact wherein the person is able to view a status of the DVR and chat with the DVR through the web or social networking account much like chatting with any other friend;

the DVR receiving a chat message from the person through the chat server; and the DVR automatically executing a predetermined instruction corresponding to a content of the received chat message wherein only authorized users are able to view and retrieve information from the DVR.

2. The method as in claim 1 further comprising a user adding the DVR as a contact by sending a friend request to the DVR.

3. The method as in claim 2 further comprising the user accepting the friend request on behalf of the DVR.

4. The method as in claim 3 further comprising the DVR automatically rejecting friend requests from any unauthorized person.

5. The method as in claim 1 wherein the step of the DVR receiving the chat message further comprises the person entering an identifier of the web or social networking account of the DVR into a chat window of the person in preparation for sending the chat message to the DVR.

6. The method as in claim 1 wherein the predetermined instruction further comprises the DVR displaying video in a chat window of the person.

7. The method as in claim 6 wherein the chat message received by the DVR further comprises the term "video" along with an identifier of a camera that collected the video to be displayed.

8. The method as in claim 1 wherein the predetermined instruction further comprises the DVR displaying a list of active alarms of the security system in a chat window of the person.

9. The method as in claim 8 wherein the chat message received by the DVR further comprises the term "alarms".

10. The method as in claim 1 wherein the predetermined instruction further comprises the DVR sending a message to a person at a central monitoring station.

11. The method as in claim 1 wherein the predetermined instruction further comprises the DVR changing a recording configuration of the DVR.

12. The method as in claim 11 wherein the chat message received by the DVR further comprises an identifier of a camera recorded by the DVR and a change in a recording parameter of the camera.

13. A system comprising:
a web or social networking account established within a chat server for a digital video recorder (DVR) of a security system;
a user interface or user device of a person that adds the web or social networking account of the DVR as a contact wherein the person is able to view a status of the DVR and chat with the DVR through the web or social networking account much like chatting with any other friend;
a chat message received by the DVR from the person through the chat server; and
a predetermined instruction corresponding to a content of the received chat message automatically executed by the DVR wherein only authorized users are able to view and retrieve information from the DVR.

14. The system as in claim 13 wherein the predetermined instruction further comprises an instruction that plays a video sequence within a chat window of the person.

15. The system as in claim 14 wherein the chat message received by the DVR further comprises an identifier of a video camera recorded by the DVR and displayed in the chat window by the DVR.

16. The system as in claim 13 wherein the predetermined instruction further comprises an instruction that displays a list of alarms active within the security system within a chat window of the person.

17. The system as in claim 16 wherein the chat message received by the DVR further comprises the term "alarms".

18. The system of claim 13 wherein the predetermined instruction further comprises an instruction that forwards a portion of the chat message to a person in a central monitoring station.

19. The system of claim 18 wherein the chat message received by the DVR further comprises an identifier of the central monitoring station and text that defines the message.

20. A system comprising:
a digital video recorder (DVR) of a security system;
a networking processor of the DVR that interfaces with a chat server through a web or social networking account established within the chat server for the DVR;
a user interface or user device of a person that adds the web or social networking account of the DVR as a contact wherein the person is able to view a status of the DVR and chat with the DVR through the web or social networking account much like chatting with any other friend;
a message processor of the DVR that processes a chat message received by the DVR from the person through the chat server; and
an instruction processor of the DVR that automatically executes a predetermined instruction corresponding to a content of the received chat message wherein only authorized users are able to view and retrieve information from the DVR.

* * * * *